(12) United States Patent
Kato et al.

(10) Patent No.: US 7,637,662 B2
(45) Date of Patent: Dec. 29, 2009

(54) ROLLING GUIDE UNIT

(75) Inventors: Masataka Kato, Mino (JP); Norimasa Agari, Mino (JP)

(73) Assignee: Nippon Thompson Co., Ltd., Minato-Ku, Tokyo (JP)

( * ) Notice: Subject to any disclaimer, the term of this patent is extended or adjusted under 35 U.S.C. 154(b) by 663 days.

(21) Appl. No.: 11/192,880

(22) Filed: Jul. 29, 2005

(65) Prior Publication Data

US 2006/0023980 A1 Feb. 2, 2006

(30) Foreign Application Priority Data

Jul. 30, 2004 (JP) ............................. 2004-223280

(51) Int. Cl.
*F16C 29/06* (2006.01)
(52) U.S. Cl. .......................................... 384/43; 384/13
(58) Field of Classification Search ................... 384/13, 384/43–45
See application file for complete search history.

(56) References Cited

U.S. PATENT DOCUMENTS

| | | | | |
|---|---|---|---|---|
| 4,732,489 | A * | 3/1988 | Tanaka | 384/45 |
| 5,496,113 | A * | 3/1996 | Winkelmann et al. | 384/13 |
| 5,695,288 | A * | 12/1997 | Sugihara et al. | 384/13 |
| 6,024,490 | A * | 2/2000 | Shirai | 384/13 |
| 6,190,046 | B1 * | 2/2001 | Agari | 384/13 |
| 6,203,199 | B1 * | 3/2001 | Pfeuffer | 384/45 |
| 6,435,718 | B1 * | 8/2002 | Weiss et al. | 384/13 |
| 6,712,511 | B2 * | 3/2004 | Matsui et al. | 384/45 |
| 2004/0029740 | A1 * | 2/2004 | Yatsushiro et al. | 508/110 |
| 2005/0201644 | A1 * | 9/2005 | Lee et al. | 384/13 |
| 2006/0215943 | A1 * | 9/2006 | Agari et al. | 384/13 |

FOREIGN PATENT DOCUMENTS

| | | | | |
|---|---|---|---|---|
| JP | 09303392 | A * | 11/1997 | |
| JP | 3066116 | | 11/1999 | |
| JP | 2000027861 | A * | 1/2000 | |
| JP | 2000035038 | A * | 2/2000 | |
| JP | 2000145769 | A * | 5/2000 | |
| JP | 200182469 | | 3/2001 | |

* cited by examiner

*Primary Examiner*—Thomas R Hannon
*Assistant Examiner*—Phillip Johnson
(74) *Attorney, Agent, or Firm*—Cozen O'Connor

(57) ABSTRACT

A rolling guide unit as provided here is capable of raising the degree of flexibility in design and simplifying the control of lubricating oil and has a low sliding resistance to the rolling elements. The rolling guide unit is provided with a cylindrical member 2 through which a rail 1 passes for it to slide on, raceway paths a constituted of a combination of the cylindrical member 2 and the rail 1, circuit paths b formed in the cylindrical member 2 and each making interconnection between the two ends of each of the raceway paths a by way of direction-changing recesses 18, and a plurality of rolling elements 19 placed in the circuit paths b and the raceway paths a. The rolling elements 19 circulate in the circuit paths b and the raceway paths a in accordance with the relative movement between the rail 1 and the cylindrical member 2. The rolling guide unit is characterized by mounting holes 20 formed in the cylindrical member 2; oiled members 21 respectively installed in the mounting holes 20; and oil-supply members 23 each provided along the contact faces of the rolling elements 19 traveling through either the raceway path a or the circuit path 1. The oil-supply members 23 are in contact with the oiled members 21.

5 Claims, 16 Drawing Sheets

Fig. 9 *Prior Art*
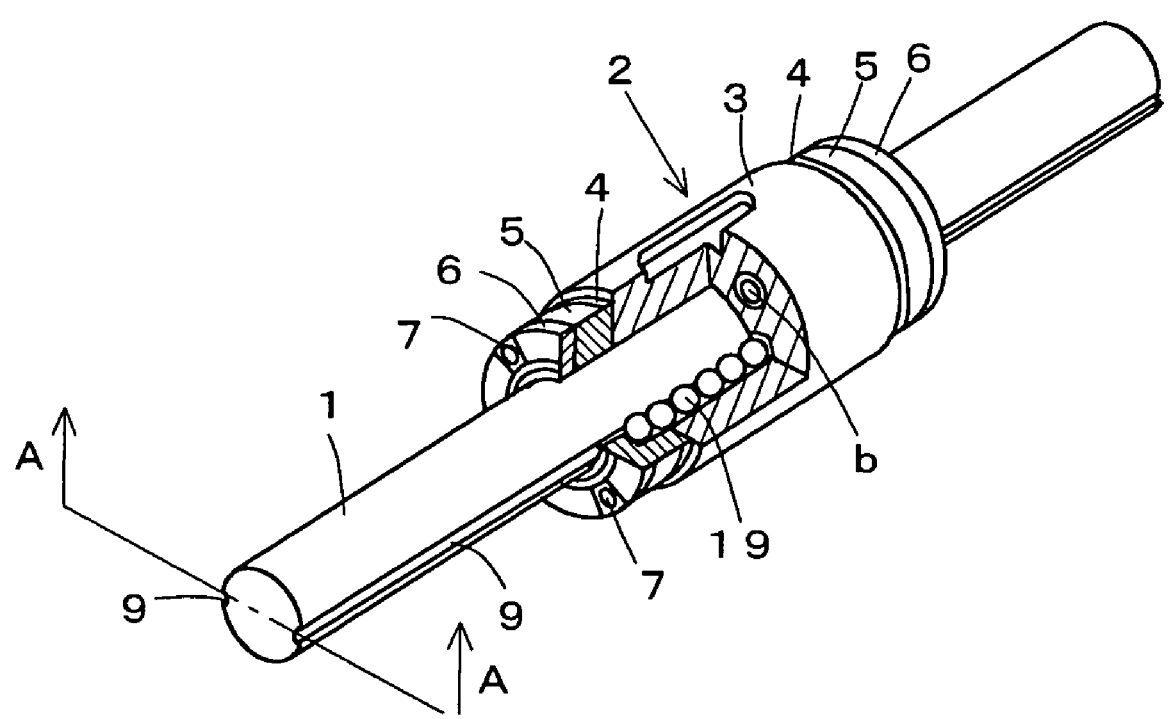

Fig. 10 *Prior Art*
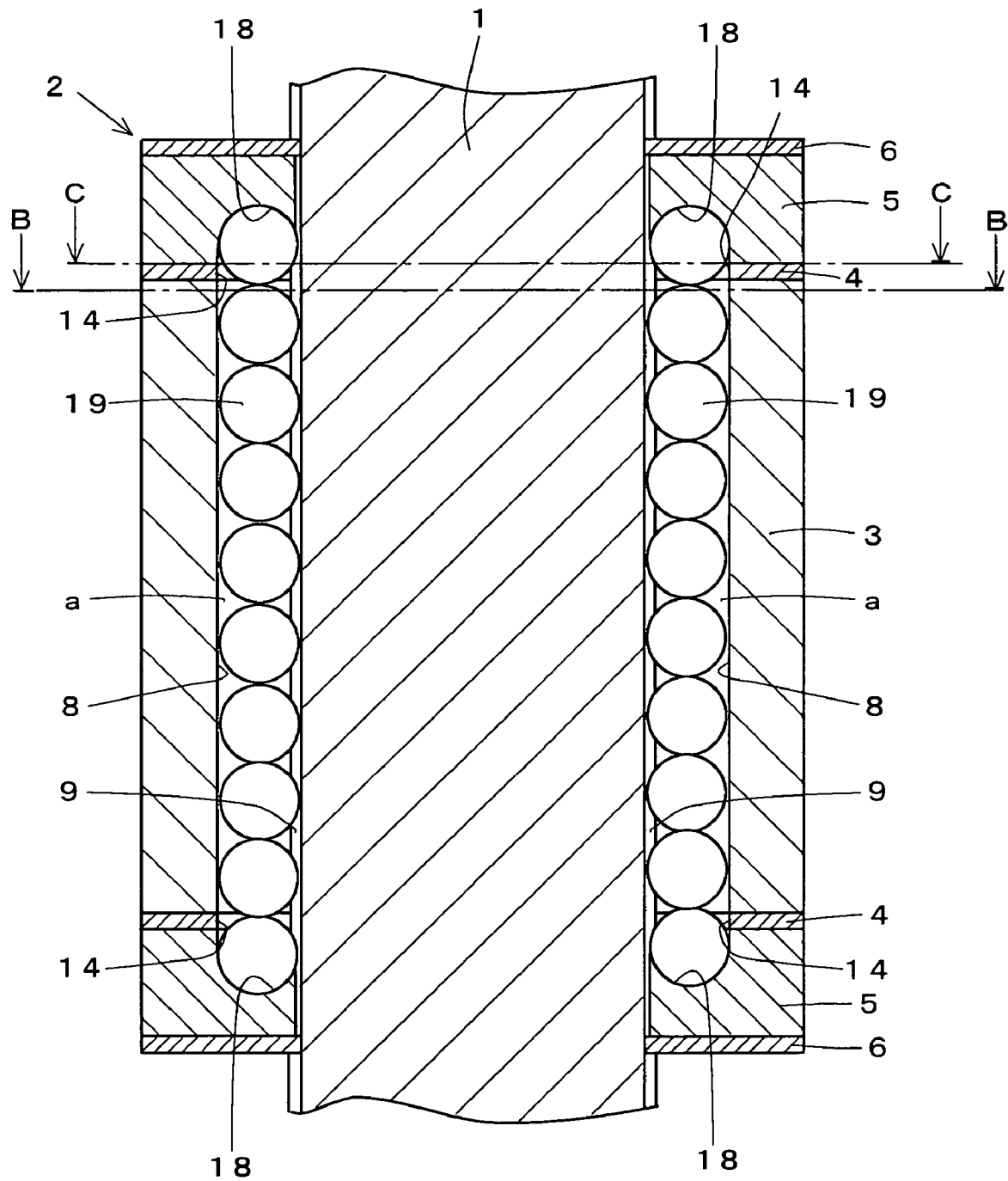

Fig. 11 *Prior Art*
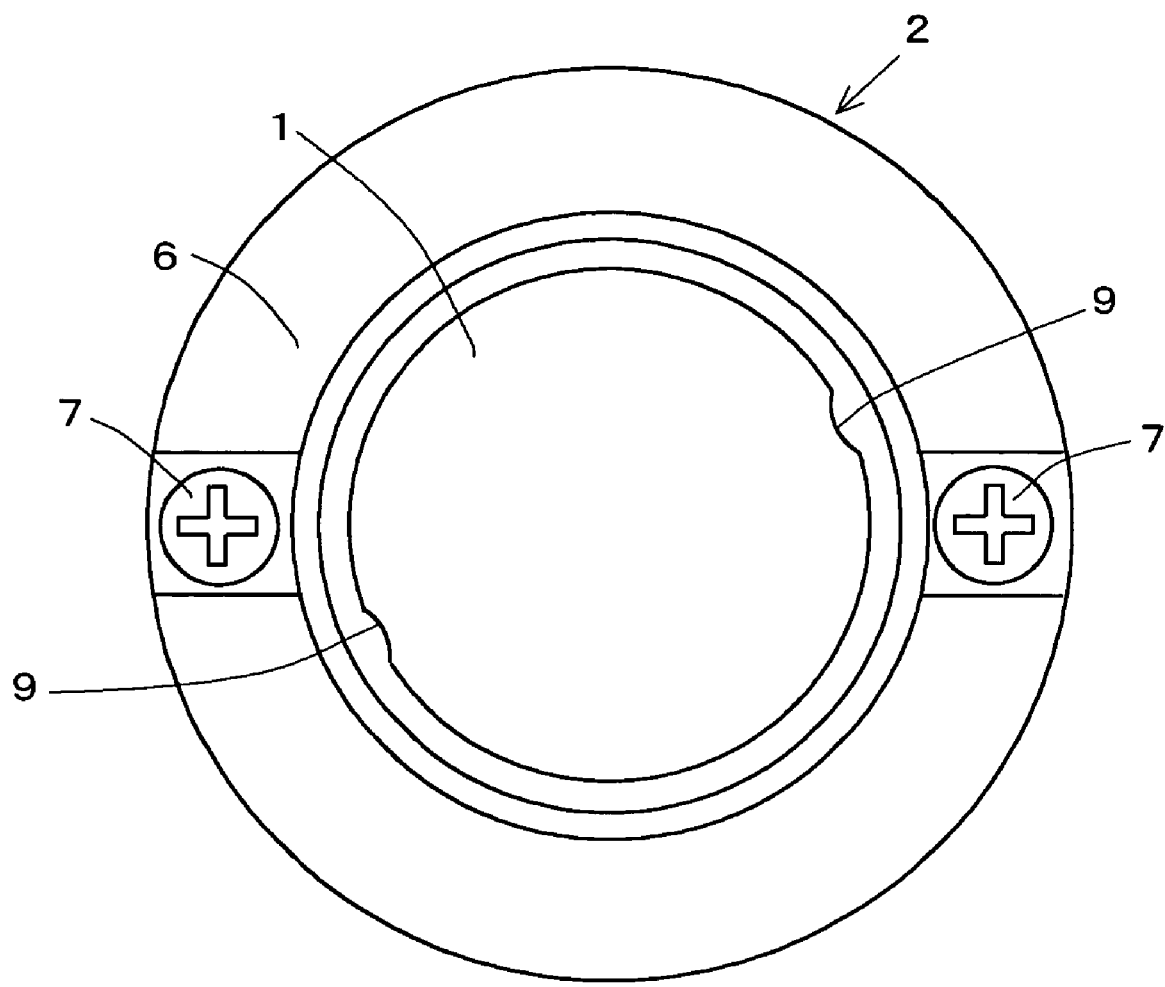

Fig. 12 *Prior Art*
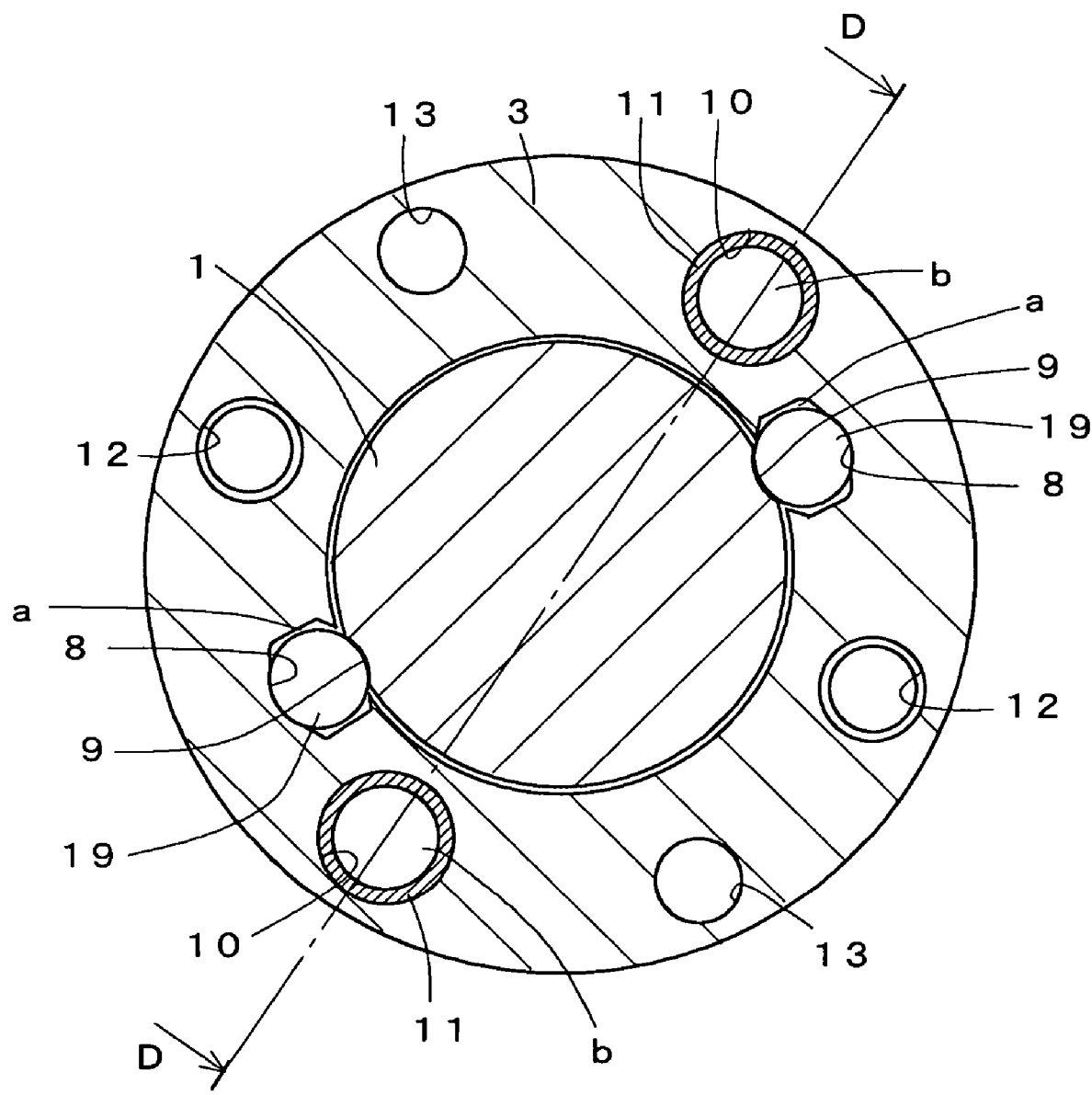

Fig. 13 *Prior Art*
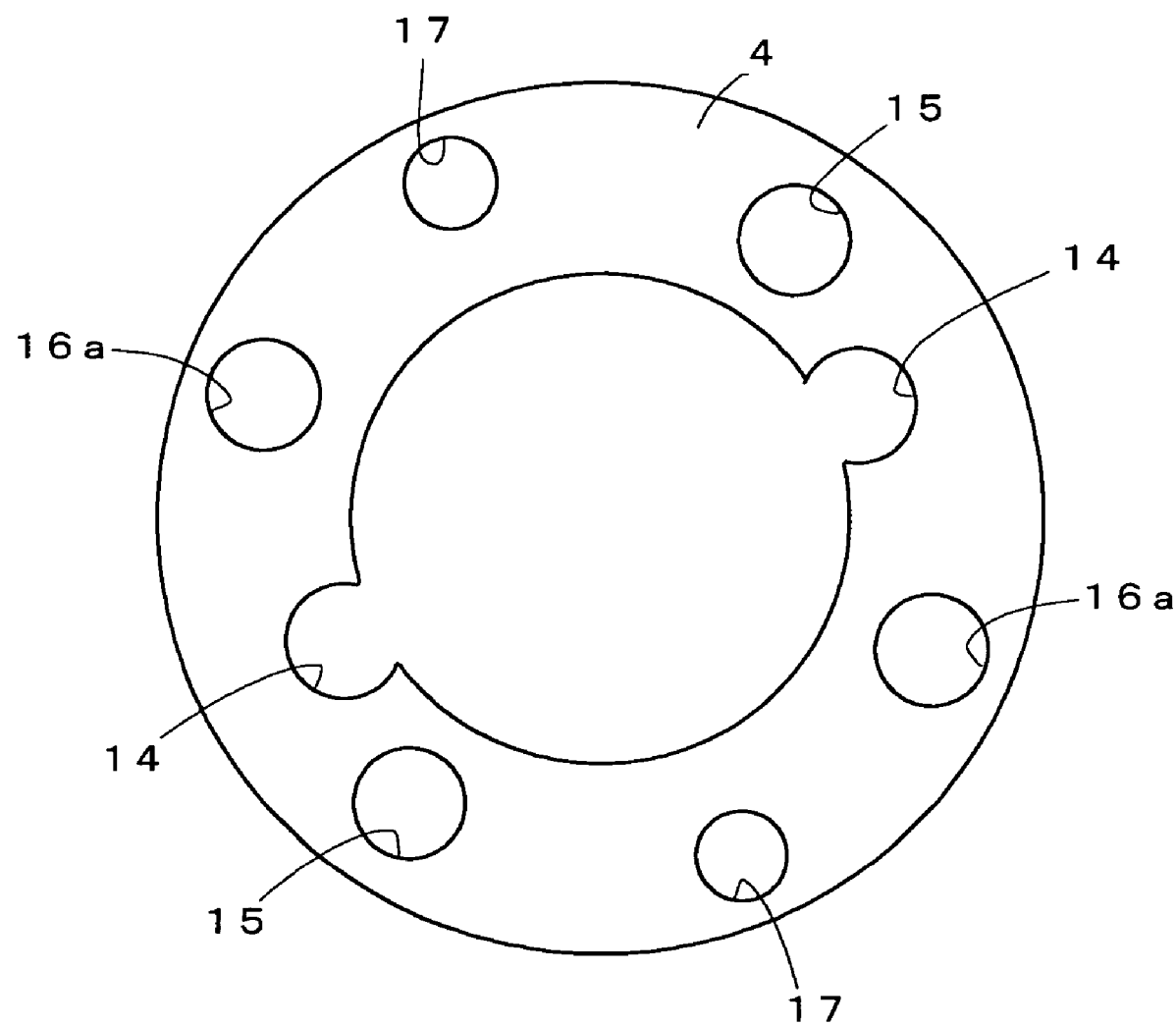

Fig. 14  *Prior Art*
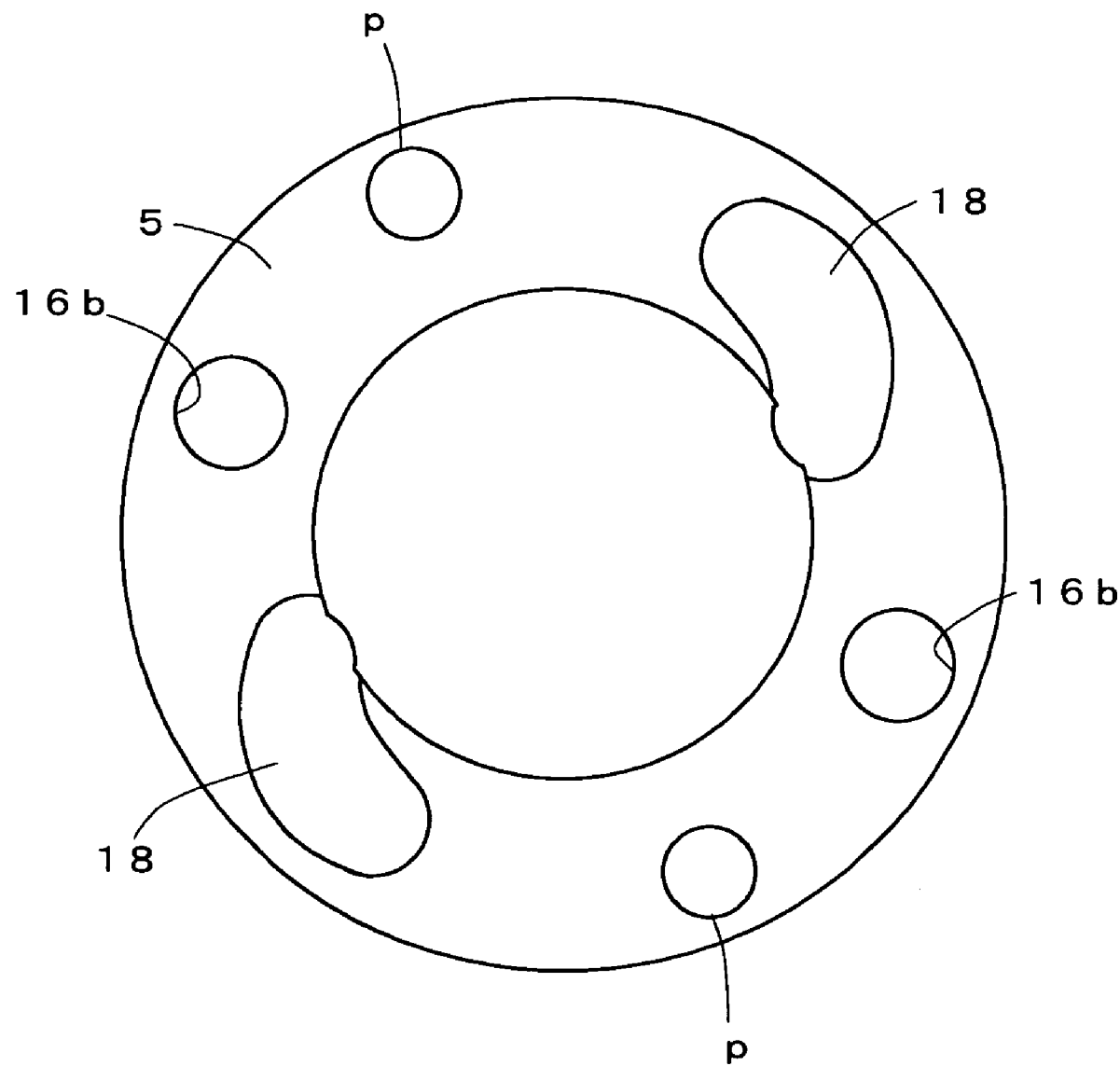

Fig. 15 *Prior Art*
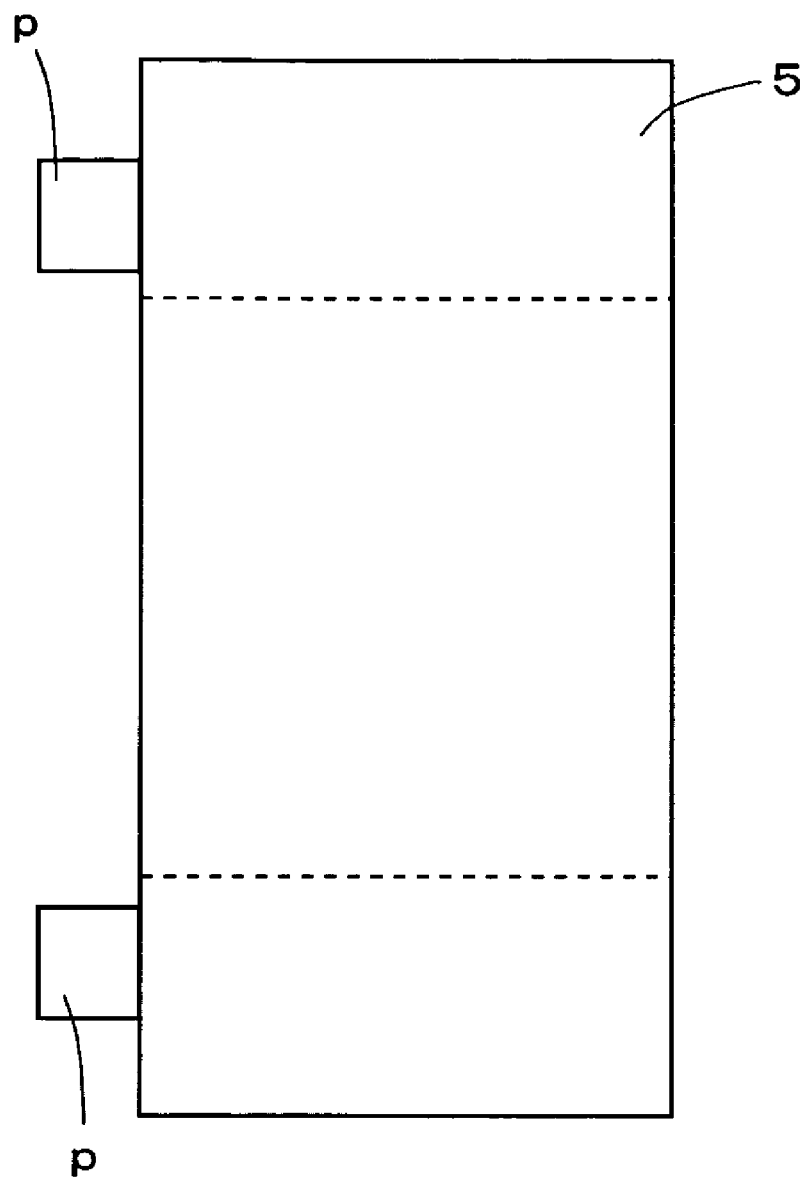

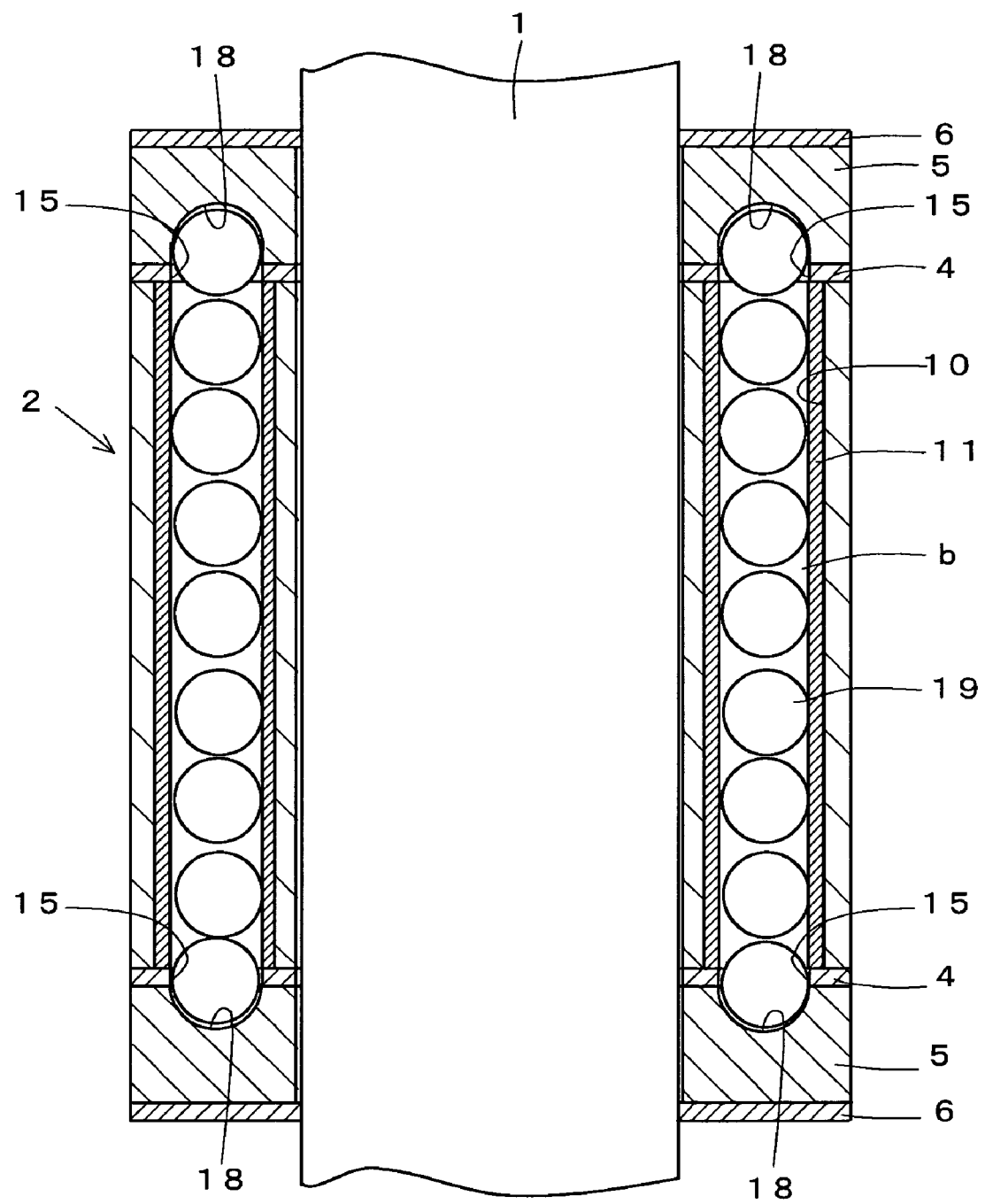
Fig. 16  *Prior Art*

ROLLING GUIDE UNIT

BACKGROUND OF THE INVENTION

1. Field of the Invention

This invention relates to a rolling guide unit for guiding the sliding of a tubular member along a rail.

2. Description of the Related Art

FIGS. 9 to 16 show an example of a conventionally known type of rolling guide unit. For example, Japanese unexamined patent publication 2001-082469 (FIG. 7) discloses such a type.

The conventional rolling guide unit is used for linearly guiding a member or transferring torque in a machine tool or an industrial machine, for example. Principal members of the rolling guide unit are a rail 1 secured to the machine and a cylindrical member 2 through which the rail 1 passes.

As shown in the sectional view of FIG. 10 taken along the A-A line in FIG. 9, the cylindrical member 2 includes a body 3, a pair of spacers 4 which are provided at the front and back in the sliding direction, a pair of end caps 5 which are respectively fixed with the spacers 4 interposed, and a pair of end seals 6 which respectively cover the outsides of the end caps 5. The spacers 4, the end caps 5 and the end seals 6 are secured to the body 3 with screws 7 as shown in FIG. 11.

FIG. 12 is a sectional view taken along the B-B line in FIG. 10 and showing a pair of raceway grooves 8 formed in the inner periphery of the body 3 in the axis direction. On the other hand, a pair of raceway grooves 9 are formed in the outer periphery of the rail 1 in the axis direction. As shown in FIG. 12, when the raceway grooves 9 of the rail 1 passing through the body 3 face the respective raceway grooves 8, the raceway grooves 9 and the raceway grooves 8 are correspondingly combined together to form a pair of raceway paths a.

The body 3 has a pair of through holes 10 extending in the axis direction. Sleeve-shaped oiled members 11 in cylindrical form and containing lubricating oil are inserted into the respective through holes 10. The interiors of the sleeve-shaped oiled members 11 are defined as a pair of return paths b.

The function of the sleeve-shaped oiled members 11 will be described in detail later.

As shown in FIG. 12, the body 3 has a pair of tapped holes 12 and a pair of positioning recesses 13 formed therein. Internal threads are respectively formed on the inner peripheries of the tapped holes 12. The screws 7 are engaged with the internal threads. The positioning recesses 13 are holes providing for insertion of projections p (see FIG. 15) formed on each of the end caps 5.

FIG. 13 is a sectional view taken along the C-C line in FIG. 10, and also a plan view of the spacer 4 when viewed from the corresponding end cap 5. As shown in FIG. 13, the spacers 4 each have raceway-path recesses 14 opening onto their inner peripheries, return-path holes 15, screw holes 16a and positioning holes 17 formed therein.

When the spacers 4 are mounted to the body 3, the raceway-path recesses 14 are respectively interconnected with the raceway paths a provided in the body 3 as shown in FIG. 10, and the return-path holes 15 are respectively interconnected with the return paths b provided in the body 3 as shown in FIG. 16. Further, the screw holes 16a are respectively interconnected with the tapped holes 12 provided in the body 3 as shown in FIG. 12. The positioning holes 17 are respectively interconnected with the positioning recesses 13 provided in the body 3.

Each of the end caps 5 is mounted on the spacer 4 as described earlier. As shown in the plan view in FIG. 14 of the end cap 5 when viewed from the body 3, each of the end caps 5 has direction-changing recesses 18 and screw holes 16b formed therein. When each of the end caps 5 is installed on the spacer 4, each of the direction-changing recesses 18 is interconnected with both the raceway-path recess 14 and the return-path hole 15 which are formed in the spacer 4 as shown in FIG. 13. This results in the interconnection between the raceway paths a and the return paths b by way of the direction-changing recesses 18.

Thus, the direction-changing recesses 18 formed in the end caps 5, the return-path holes 15 formed in the spacers 4, and the return paths b formed in the body 3 constitute two circuit paths each interconnecting the two ends of the raceway path a.

Such interconnections between the ends of the raceway paths a constitute a pair of endless paths. A plurality of rolling elements 19 such as balls are installed in the endless paths. The rolling elements 19 are placed in contact with a pair of the raceway grooves 9 in the rail 1 and a pair of the raceway grooves 8 in the cylinder 2 to produce a rolling motion so as to maintain the smooth motion of the cylinder 2 relative to the rail 1.

When the cylinder 2 is moved relatively to the rail in this manner, the rolling elements 19 in each of the raceway paths a circulate around the endless path passing through one of the direction-changing recesses 18, the return path b and the other direction-changing recess 18.

In the foregoing structure, for the over-term maintenance of a high-accuracy motion of the cylinder 2 relative to the rail 1, it is necessary to decrease the rolling resistance of the rolling elements 19, minimize the abrasion of the rolling elements 19 themselves, and minimize the abrasion of the raceway paths a and the return paths b along which the rolling elements 19 produce a rolling motion. For this purpose, there is a necessity to periodically or continuously supply lubricating oil to the rolling elements 19, the raceway paths a and the like.

Therefore, the aforementioned conventional rolling guide unit has the lubricating-oil-containing sleeve-shaped oiled members 11 installed in the through holes 10 in the axis direction in order to maintain the optimum lubrication. That is, each of the sleeve-shaped oiled members 11 is formed of a sintered resin material of a porous structure capable of including lubricating oil.

The rolling elements 19 roll in the sleeve-shaped oiled members 11, whereby the lubricating oil contained in the sleeve-shaped oiled members 11 appropriately seeps out onto the surfaces of the rolling elements 19. The rolling elements 19 receiving a supply of the lubricating oil thus seeping hereon roll in the raceway paths a and the return paths b so as to provide a supply of the lubricating oil to the overall path.

As well as the foregoing rolling guide unit disclosed in Japanese unexamined patent publication 2001-082469 (FIG. 7), the rolling guide unit disclosed in registered utility model 3066116 (FIGS. 12 to 14) is conventionally known.

The rolling guide unit disclosed in registered utility model 3066116 (FIGS. 12 to 14) has grease-including fabric protruding in the portions involved in the processes of the connection from the direction-changing recesses 18 to the through holes 10 in Japanese unexamined patent publication 2001-082469 (FIG. 7). Thereby, the rolling elements passing through the return path come into contact with the slightly protruding fabric containing grease, and receive a supply of the grease in the fabric.

The rolling guide unit disclosed in Japanese unexamined patent publication 2001-082469 (FIG. 7) has the sleeve-shaped oiled members 11 inserted into the through holes 10 in order to supply the lubricating oil to the rolling elements 19. However, a large inner diameter of each through hole 10 is required for the insertion of the sleeve-shaped oiled member 11. In other words, the required inner diameter of each sleeve-shaped oiled member 11 is equal to or larger than the diameter of the rolling element 19.

Further, the thickness of each sleeve-shaped oiled member 11 depends on the amount of lubricating oil contained in this sleeve-shaped oiled member 11. Hence, the necessary outer diameter of each sleeve-shaped oiled member 11 is, at the minimum, equal to or more than the diameter of the rolling element 19 plus double the thickness of each sleeve-shaped oiled member 11. The reason for the addition of the double thickness of each sleeve-shaped oiled member 11 is because the sleeve-shaped oiled member 11 is formed in a cylindrical form.

On the other hand, when the sleeve-shaped oiled member 11 is not installed in the through hole 10, the required inner diameter of each through hole 10 is only slightly larger than the diameter of the rolling element 19.

In other words, in the case of installing the sleeve-shaped oiled members 11 in the through holes 10, it is necessary to increase the inner diameter of each through hole 10 by at least an amount corresponding to twice the thickness of each sleeve-shaped oiled member 11.

However, as shown in FIG. 12, the through holes 10 are formed within the thickness of the cylindrical-shaped body 3. Hence, the increase in the inner diameter of each through hole 10 means a decrease in the wall thickness of the body 3. The decreased wall thickness causes a lack of strength, and in some cases a hole may possibly be made in the side face. Therefore, when the sleeve-shaped oiled members 11 are installed in the body 3, the body 3 must be increased in outer diameter or decreased in inner diameter.

However, if the outer diameter of the body 3 is increased, the cylindrical member 2 is increased in size. If the inner diameter of the body 3 is decreased, the diameter of the rail 1 must be decreased, leading to a lack of strength in the rail 1.

In short, because the conventional rolling guide unit has structural limitations, the problem of a low degree of flexibility in design arises when the sleeve-shaped oiled members 11 are installed in the body 3.

Further, the rolling guide unit disclosed in registered utility model 3066116 (FIGS. 12 to 14) has the fabric projecting, just slightly, into the moving trajectory of the rolling elements. The smooth movement of the rolling elements may be impaired due to variations in sliding resistance to the rolling elements in the contact area between the fabric and the rolling elements.

SUMMARY OF THE INVENTION

It is an object of the present invention to provide a rolling guide unit having a high degree of flexibility in design and a low sliding resistance to rolling elements.

The present invention is based on a rolling guide unit that is provided with a cylindrical member through which a rail passes for it to slide on, raceway paths constituted of a combination of the cylindrical member and the rail, circuit paths formed in the cylindrical member and each making interconnection between opposite ends of each of the raceway paths by way of direction-changing recesses, and a plurality of rolling elements placed in the circuit paths and the raceway paths, and circulating in the circuit paths and the raceway paths in accordance with relative movement between the rail and the cylindrical member.

Based on this rolling guide unit, a first feature of the present invention is to have: mounting holes formed in the cylindrical member; oiled members respectively installed in the mounting holes; and oil-supply members each provided along the contact faces of the rolling elements traveling through either the raceway path or the circuit path, and to place the oil-supply members in contact with the oiled members.

A second feature of the present invention is that the oiled members and the oil-supply members are formed of the same materials.

A third feature of the present invention is that the oil-supply members are respectively placed on the end faces of the bar-shaped oiled members inserted in the mounting holes, and the oil-supply members are respectively provided with projecting pieces having elasticity in relation to the oiled members, and the projecting pieces are in pressured contact with the oiled members.

A fourth feature of the present invention is that the cylindrical member comprises a body and end caps provided on the opposite ends of the body, the direction-changing recesses making continuous connection between the circuit paths and the raceway paths are provided in the end caps, and the oil-supply members have curved faces formed in accordance with a curvature of the direction-changing recesses, with the curved faces extending along the outer faces of the direction-changing recesses.

According to the first feature, the raceway path and/or the circuit path are not required to have a large inner diameter for the installation of the oiled member, which in turn increases the degree of flexibility in design. This is because the oil-supply member is provided in contact with the end face of the bar-shaped oiled member inserted in the mounting hole, and the oil-supply member is placed along the contact faces of the rolling elements traveling through either the raceway path or the circuit path.

Further, what is required for the oil-supply member is to be in contact with the oiled member. Therefore, as long as the contact conditions are maintained, the oiled member can be placed anywhere. From this viewpoint, the degree of flexibility in design is further increased.

Still further, a simple overall structure and an enhancement of the productivity are achieved because the mounting hole is provided for installing the oiled member and the oil-supply member is capable of being simply fitted.

According to the second feature, the supply of oil from the oiled member to the oil-supply member is made stable because the oiled member and the oil-supply member are formed of the same materials and therefore are identical in oil content.

According to the third feature, the oil is transferred smoothly and reliably from the oiled member to the oil-supply member because the oil-supply member has a projecting piece provided in pressured contact with the oiled member.

According to the fourth feature, the oil-supply member has a curved face having a curvature equal to that of the direction-changing recess. This curved face is placed along the outer face of the direction-changing recess. As a result, the oil-supply member does not produce resistance to the rolling elements. Further, the action of the centrifugal force produced when the rolling elements travel through the direction-changing recess makes for the reliable contact with the oil-supply member. This reliable contact between the rolling elements and the oil-supply member ensures the reliable supply of the lubricating oil to the rolling elements.

BRIEF DESCRIPTION OF THE DRAWINGS

FIG. 9 is a perspective view of a conventional example.

FIG. 10 is a sectional view taken along the A-A line in FIG. 9 showing the conventional example.

FIG. 11 is a front view of a cylindrical member in the conventional example.

FIG. 12 is a sectional view taken along the B-B line in FIG. 10 showing the conventional example.

FIG. 13 is a sectional view taken along the C-C line in FIG. 10 showing the conventional example.

FIG. 14 is a plan view of an end cap of the conventional example when viewed from a body.

FIG. 15 is a side view of the end cap of the conventional example.

FIG. 16 is a sectional view taken along the D-D line in FIG. 12 showing the conventional example.

DETAILED DESCRIPTION OF THE PREFERRED EMBODIMENT

Figure 1:
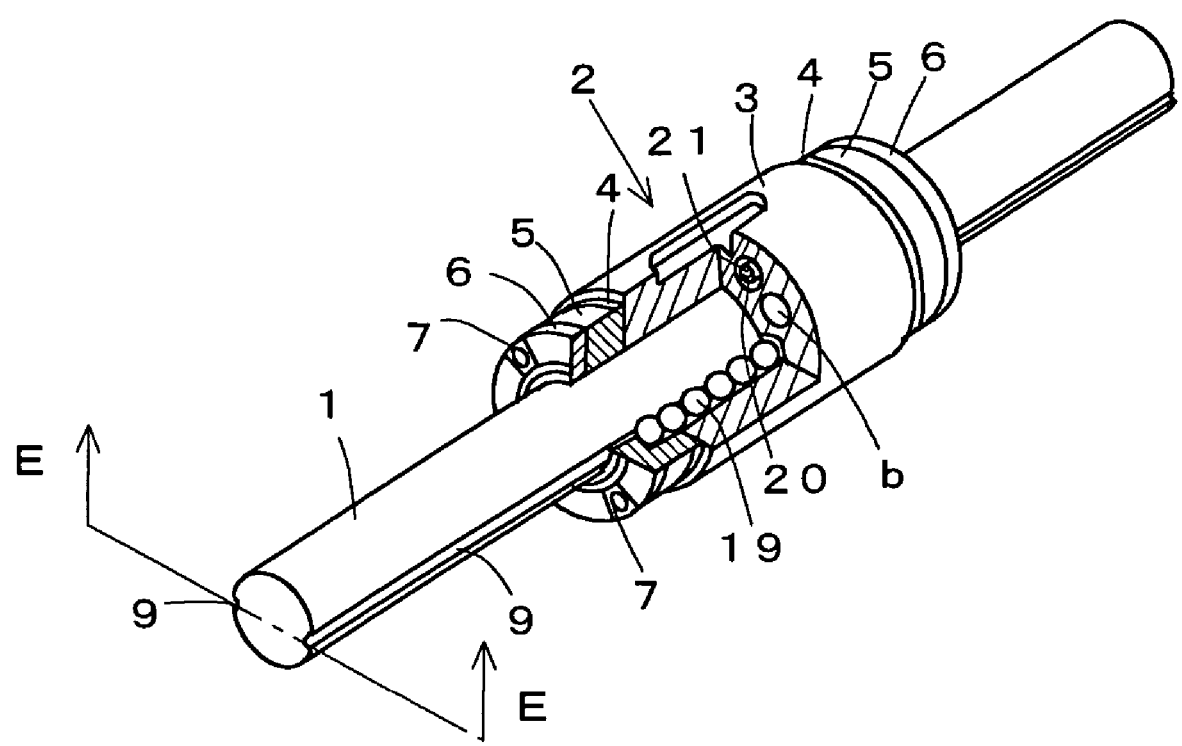
FIG. 1 is a perspective view with a cut-away part.

FIG. 1 to FIG. 8 illustrate a first embodiment according to the present invention. The same or similar components in the first embodiment as those described in FIG. 9 to FIG. 16 are designated by the same or similar reference numerals for description.

As shown in FIG. 1, a rail 1 secured to a machine passes through a cylindrical member 2.

Figure 3:
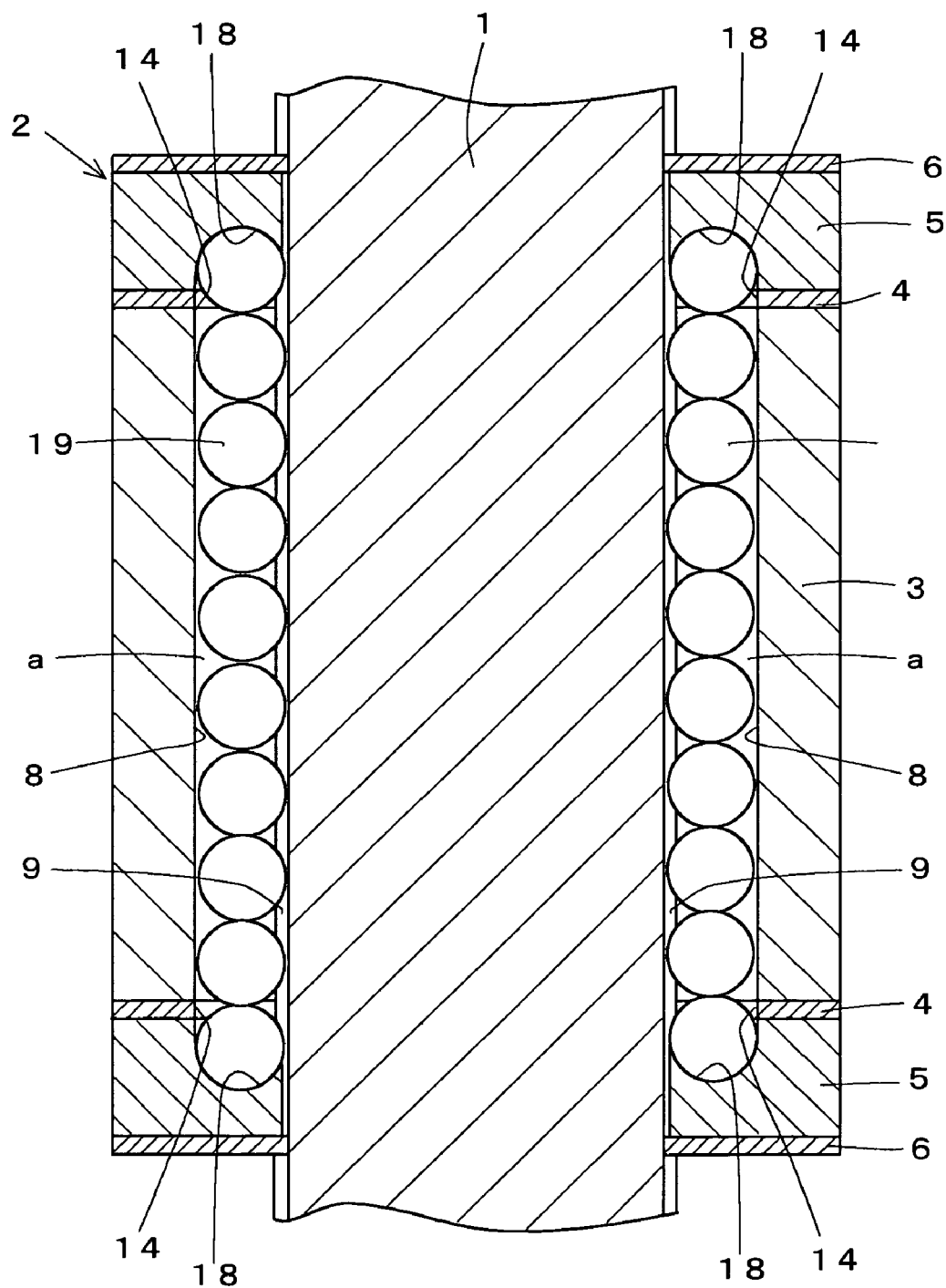
FIG. 3 is a sectional view taken along the E-E line in FIG. 1.

As shown in the sectional view of FIG. 3 taken along the E-E line in FIG. 1, the cylindrical member 2 includes a body 3, a pair of spacers 4 which are provided at the front and back ends in the sliding direction, a pair of end caps 5 which are respectively fixed with the spacers 4 interposed, and a pair of end seals 6 which respectively cover the outsides of the end caps 5. The spacers 4, the end caps 5 and the end seals 6 are secured to the body 3 with screws 7 as shown in FIG. 1.

Figure 4:
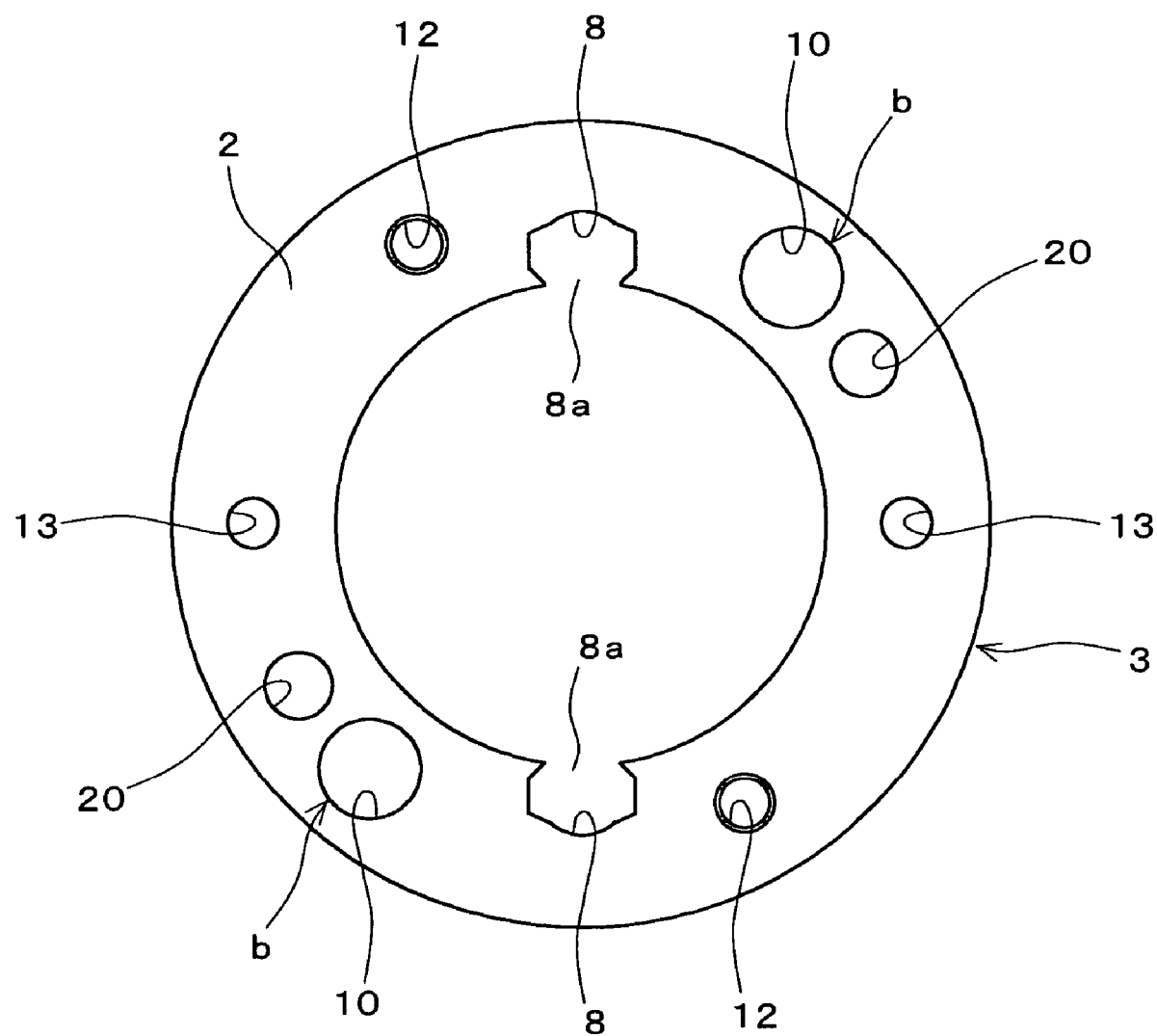
FIG. 4 is an end view of a body.

FIG. 4 is an end view of the body 3 and shows a pair of raceway grooves 8 formed in the body 3 in the axis direction. The raceway grooves 8 open onto the rail 1 passing through the cylindrical member 2. As shown in FIG. 4, the width of each of the openings 8a is smaller than the diameter of a rolling element 19 such as a ball. Accordingly, the rolling elements 19 inserted into the raceway groove 8 do not come out from the openings 8a.

On the other hand, a pair of raceway trenches 9 are formed in the outer periphery of the rail 1 in the axis direction. As is clear from FIG. 3, when the raceway grooves 9 of the rail 1 passing through the body 3 face the respective raceway grooves 8 formed in the body 3, the raceway grooves 8 and the raceway grooves 9 are correspondingly combined together to form a pair of raceway paths a.

The body 3 has a pair of through holes 10 extending in the axis direction. The interiors of the through holes 10 are defined as a pair of return paths b.

Further, a pair of mounting holes 20 of circular cross section are drilled in the body 3 and respectively extend in the vicinities of the through holes 10 in the axis direction.

Figure 2:
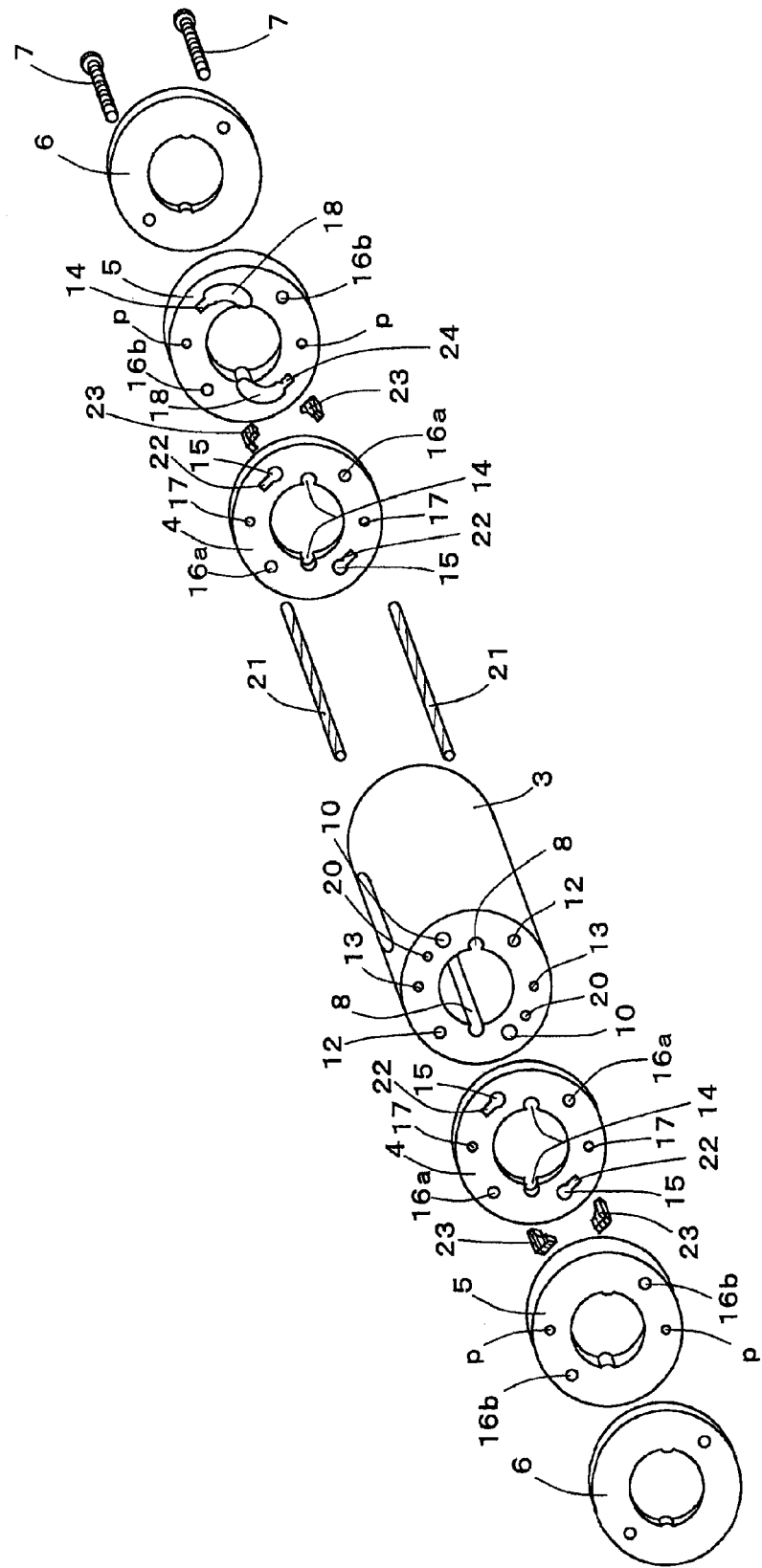
FIG. 2 is an exploded perspective view.

Bar-shaped oiled members 21 as shown in FIG. 2 are respectively inserted into these mounting holes 20. Each of the oiled members 21 is formed of a sintered resin material of a porous structure capable of containing lubricating oil.

As shown in FIG. 4, the body 3 has a pair of tapped holes 12 and a pair of positioning recesses 13 formed therein. The tapped holes 12 are for mounting the screws 7, so that internal threads are respectively formed on the inner peripheries thereof. The positioning recesses 13 are holes providing for the insertion of projections p (see FIG. 6) which are provided for positioning on each of the end caps 5.

Figure 5:
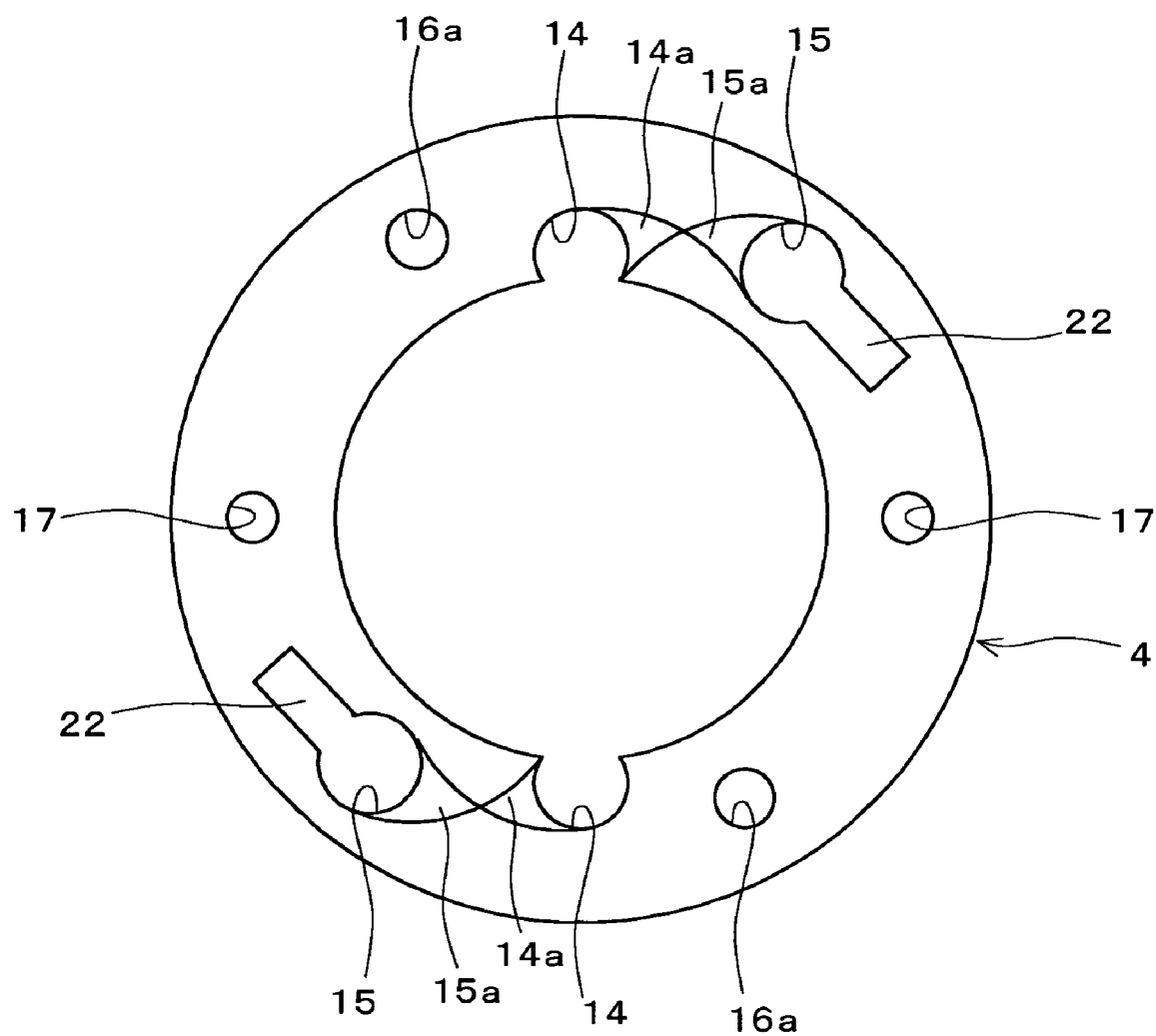
FIG. 5 is a plan view of a spacer when viewed from an end cap.

FIG. 5 is a plan view of the spacer 4 when viewed from the corresponding end cap 5. As is seen form FIG. 5, the spacers 4 each have raceway-path recesses 14 opening onto their inner peripheries, return-path holes 15, screw holes 16a and positioning holes 17 formed therein. When each of the spacer 4 are mounted on the body 3, the raceway-path recesses 14 are respectively interconnected with the raceway paths a provided in the body 3, and the return-path holes 15 are respectively interconnected with the return paths b provided in the body 3.

In each of the spacers 4 structured in this manner, fitting grooves 22 open into the return-path holes 15, and are provided for fitting oil-supply members 23 described later. When the spacer 4 is fitted to the body 3, the fitting grooves 22 are respectively positioned in correspondence with the openings of the mounting holes 20 formed in the body 3.

Further, the screw holes 16a are respectively interconnected with the tapped holes 12 provided in the body 3 as shown in FIG. 4.

Reference numerals 14a and 15a in FIG. 5 denote guide grooves. The rolling elements 19 described later are smoothly guided through the guide grooves 14a and 15a.

Figure 6:
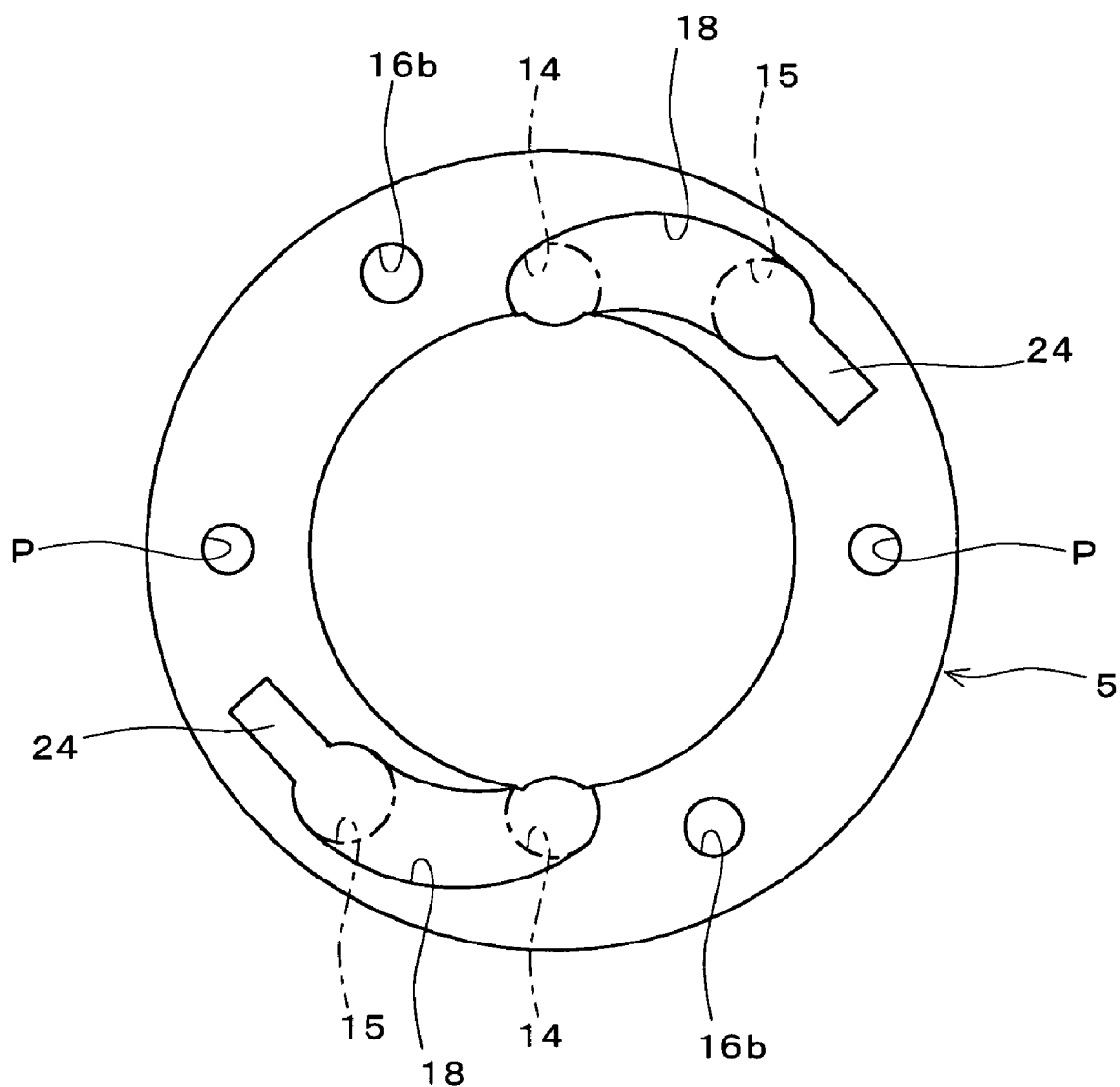
FIG. 6 is a plan view of the end cap when viewed from the body.

The exterior face of each spacer 4 is in contact with the end cap 5. As shown in FIG. 6 (a plan view when viewed from the body 3), each of the end caps 5 has direction-changing recesses 18 and screw holes 16b formed therein.

When this end cap 5 is installed on the corresponding spacer 4, the direction-changing recesses 18 are interconnected with both the raceway-path recesses 14 and the return-path holes 15 which are formed in the spacer 4. This results in the interconnection between the raceway paths a and the return paths b by way of the corresponding direction-changing recesses 18.

Thus, the direction-changing recesses 18 formed in the end caps 5, the return-path holes 15 formed in the spacers 4, and the return paths b formed in the body 3 constitute circuit paths interconnecting the opposite ends of the raceway paths a in the present invention.

Mounting recesses 24 for installing the oil-supply members 23 are respectively formed in the ends of the direction-changing recesses 18 close to the return-path holes 15. The oil-supply members 23 are mounted in the mounting recesses 24. Each of the oil-supply members 23 is shaped in a chip form rectangular in section and formed of a sintered resin material of a porous structure capable of containing lubricating oil as in the case f the oiled member 21.

Figure 7:
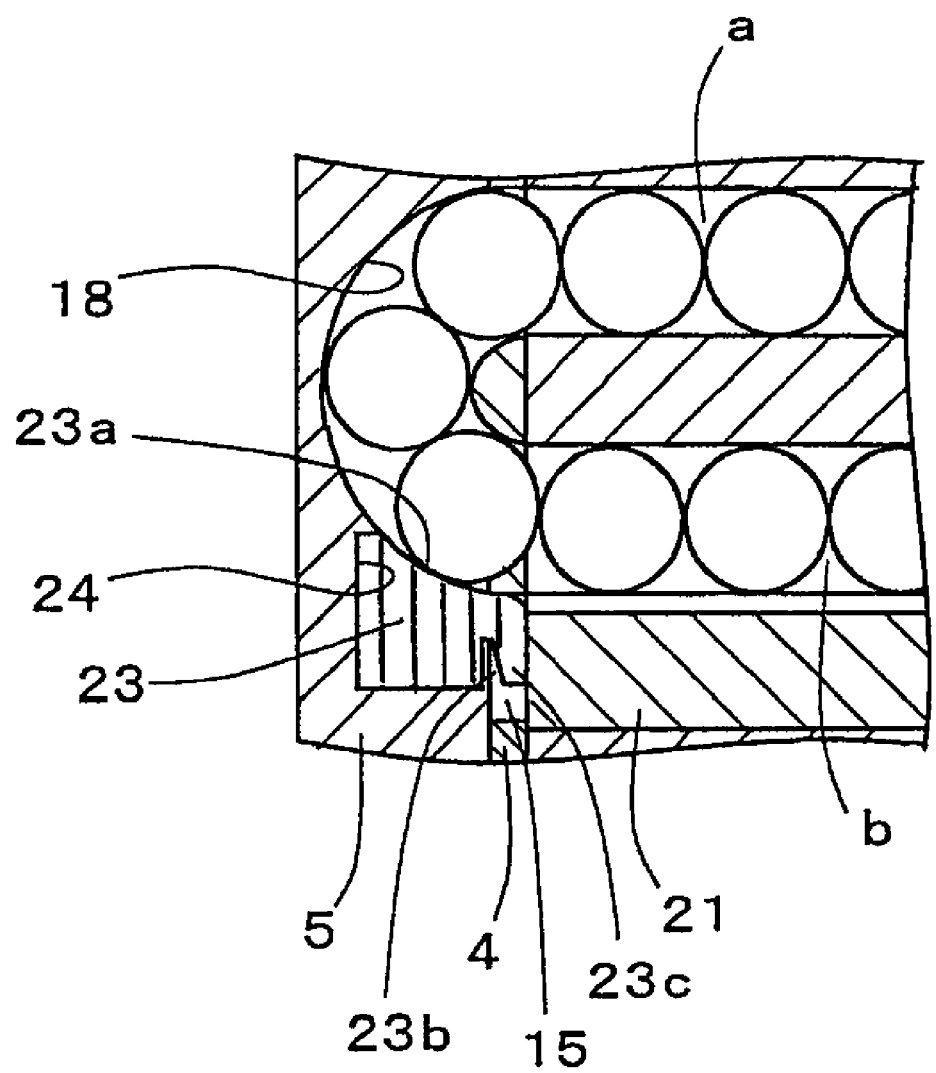
FIG. 7 is a partially sectional view of the end cap with an oil supply member installed therein.

As is clear from FIG. 7, each of the oil-supply members 23 has a face exposed to the direction-changing recess 18 when it is fitted into the mounting recess 24. The exposed face constitutes a circular arc portion 23a that has a curvature equal to that of the direction-changing recess 18. The oil-supply member 23 is located on a portion of the outer periphery of the direction-changing recess 18 adjacent to the opening of the return path b as shown in FIG. 7.

Accordingly, the rolling elements 19 traveling from each of the return paths b to each of the direction-changing recesses 18 change direction along the curvature of the direction-changing recess 18. At this point, a centrifugal force acts on the rolling elements 19. The oil-supply member 23 is adjacent to the opening of the return path b and located on the outer periphery of the direction-changing recess 18. For this reason, the action of the centrifugal force ensures that the rolling elements 1 come into contact with the oil-supply member 23 and presses the rolling elements against the oil-supply member 23.

Notches 23b are formed in the respective oil-supply members 23. Further, projecting pieces 23c are respectively formed in portions of the oil-supply members 23 located on the inner side of the notches 23b, namely, close to the mounting holes 20 in which the oiled members 23 are installed. Each of the projecting pieces 23c has the elastic quality of expanding toward the mounting hole 20. By the elastic force of the projecting piece 23c, the projecting piece 23c comes into pressured contact with the end face of the oiled member 21 installed in the mounting hole 20.

Figure 8:
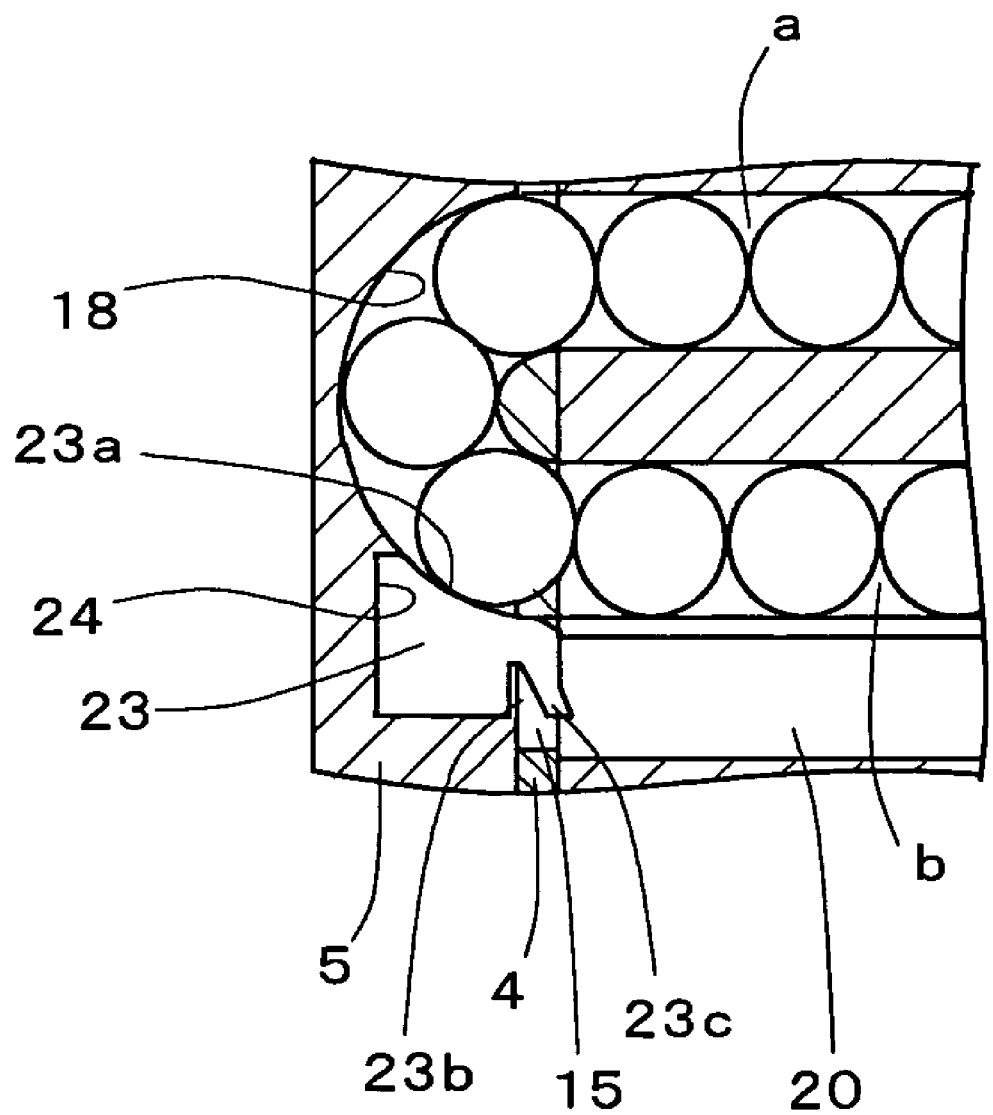
FIG. 8 is a partially sectional view showing the state when an oiled member is removed from FIG. 7.

Accordingly, as shown in FIG. 8, when the oiled member 21 is not installed in the mounting hole 20, the projecting piece 23c slightly projects into the mounting hole 20. It is needless to say that, for the purpose of maintaining the situation where the projecting piece 23c comes into pressured contact with the end face of the oiled member 21, the length of the oiled member 21 is adjusted so that the end face of the oiled member 21 is exposed to the opening of the mounting hole 20.

Through the pressured contact of the projecting piece 23c of the oil-supply member 23 with the oiled member 21, the oil included in the oiled member 21 is sucked up via the projecting piece 23c into the oil-supply member 23.

Such an interconnection between the two ends of each of the raceway paths a by way of the direction-changing recesses 18 constitutes a pair of endless paths. A plurality of rolling elements 19 constituted of balls are installed in the endless paths. The rolling elements 19 are placed in contact with each of the raceway grooves 9 in the rail 1 and each of the raceway grooves 8 in the cylinder 2, to thereby produce rolling motion so as to maintain the smooth motion of the cylinder 2 relative to the rail 1.

When the cylinder 2 is moved relatively to the rail 1 in this manner, the rolling elements 19 in each of the raceway paths a circulate in order through the raceway path a, one of the direction-changing recesses 18, the return path b and the other direction-changing recess 18.

Because each of the oil-supply members 23 is exposed in the direction-changing recess 18, when the rolling elements 19 move within the direction-changing recess 18, the surfaces of the rolling elements 19 come into contact with the oil-supply member 23, and thus receive a supply of lubricating oil from the oil-supply member 23. The rolling elements 19 supplied with the lubricating oil roll in the raceway path a and so on, thereby supplying the appropriate amount of lubricating oil to the whole of the path.

As described hitherto, the supply of the lubricating oil to the surfaces of the rolling elements 19 makes it possible to decrease the rolling resistance of the rolling elements 19, minimize the abrasion of the rolling elements 19 themselves, and minimize the abrasion of the raceway paths a and the return paths b on which the rolling elements 19 exert a rolling motion. Accordingly, the long-term maintenance of high-accuracy motion of the cylinder 2 relative to the rail 1 is achieved.

Further, according to the embodiment, there is no necessity to specially increase the inner diameter of each through hole 10 for the installation of the oiled members 21. The elimination of the necessity to increase the inner diameter of the through holes 10 makes possible a high degree of flexibility in design.

The embodiment has described the case where the oil-supply members 23 are exposed to the direction-changing recesses 18, but the oil-supply members 23 can be provided in every place as long as the oil-supply member is exposed to the circuit path of the rolling elements. Note that it goes without saying that the projecting pieces 23c of the oil-supply members 23 must come into pressured contact with the oiled members 21.

In any case, what is required is for the oil-supply members 23 to be exposed to some point in the circuit path. In this regard, it is also possible to increase the degree of flexibility in design.

Further, because the material of the oiled members 21 is the same as that of the oil-supply members 23, the oiled members 21 and the oil-supply members 23 are identical in oil content. This means a more stable supply of oil from the oiled members 21 to the oil-supply members 23.

What is claimed is:

1. A rolling guide unit provided with a cylindrical member (2) through which a rail (1) passes for the cylindrical member to slide on, raceway paths (a) constituted of a combination of the cylindrical member (2) and the rail (1), circuit paths (b) formed in the cylindrical member (2) and each making interconnection between two ends of each of the raceway paths (a) by way of direction-changing recesses (18), and a plurality of rolling elements (19) placed in the circuit paths (b) and the raceway paths (a), the rolling elements (19) circulating in the circuit paths (b) and the raceway paths (a) in accordance with relative movement between the rail (1) and the cylindrical member (2), comprising:

mounting holes (20) formed in the cylindrical member (2) and having a length in an axial direction of the rail;

bar-shaped oiled members (21) containing an oil respectively installed in the mounting holes (20); and oil-supply members (23) each provided with a projecting piece (23c) having elasticity for making pressured contact with one end of the oiled member (21); the projecting piece (23c) having an exposed face exposed along contact faces of the rolling elements (19) traveling through either the raceway path (a) or the circuit path (b), and in contact with the rolling elements, wherein the oil-supply members (23) suck up the oil contained in the bar-shaped oiled members (21) via the projecting piece (23c) pressured against the one end of the oiled member and supplies this lubricating oil to the surfaces of the rolling elements (19).

2. A rolling guide unit according to claim 1, wherein the oiled members (21) and the oil-supply members (23) are formed of the same materials.

3. A rolling guide unit according to claim 1, wherein the oil-supply members (23) are placed on end each face of the bar-shaped oiled members (21) inserted in the mounting holes (20).

4. A rolling guide unit according to claim 1, wherein
the cylindrical member (2) comprises a body (3) and end caps (5) provided on opposite ends of the body (3), the direction-changing recesses (18) making continuous connection between the circuit paths (b) and the raceway paths (a) are provided in the end caps (5), the oil-supply members (23) have curved faces formed in accordance with a curvature of the direction-changing recesses (18), the curved faces extending along an outer periphery of the direction-changing recesses (18).

5. A rolling guide unit according to claim 3, wherein the cylindrical member (2) comprises a body (3) and end caps (5) provided on the opposite end faces of the body (3), the direction-changing recesses (18) making continuous connection between the circuit paths (b) and the raceway paths (a) are provided in the end caps (5), the oil-supply members (23) have curved faces formed in accordance with a curvature of the direction-changing recesses (18), the curved faces extending along an outer periphery of the direction-changing recesses (18).

\* \* \* \* \*